United States Patent
Jiang et al.

(10) Patent No.: US 12,244,935 B2
(45) Date of Patent: Mar. 4, 2025

(54) ON-BOARD TUNING OF IMAGE SIGNAL PROCESSOR FOR CAMERAS OF AUTONOMOUS VEHICLES

(71) Applicant: Apollo Autonomous Driving USA LLC, Sunnyvale, CA (US)

(72) Inventors: Shu Jiang, Sunnyvale, CA (US); Szu-Hao Wu, Sunnyvale, CA (US); Jeong Ho Lyu, Sunnyvale, CA (US); Linpeng Cheng, Sunnyvale, CA (US); Hao Liu, Sunnyvale, CA (US); Helen K. Pan, Sunnyvale, CA (US)

(73) Assignee: APOLLO AUTONOMOUS DRIVING USA LLC, Sunnyvale, CA (US)

( * ) Notice: Subject to any disclaimer, the term of this patent is extended or adjusted under 35 U.S.C. 154(b) by 151 days.

(21) Appl. No.: 17/991,004

(22) Filed: Nov. 21, 2022

(65) Prior Publication Data
US 2024/0171864 A1      May 23, 2024

(51) Int. Cl.
*H04N 23/76*      (2023.01)
*G06V 10/70*      (2022.01)
(Continued)

(52) U.S. Cl.
CPC .............. *H04N 23/76* (2023.01); *G06V 10/70* (2022.01); *G06V 10/955* (2022.01); *G06V 20/588* (2022.01); *H04N 23/71* (2023.01)

(58) Field of Classification Search
CPC ......... H04N 23/60–617; H04N 23/667; H04N 23/67; H04N 23/70–741; H04N 23/75; H04N 23/76; H04N 23/71; H04N 23/74; H04N 23/56; H04N 23/73; H04N 23/90; H04N 23/72; H04N 23/741; H04N 23/745; H04N 23/749; H04N 23/80; H04N 23/81; H04N 23/811; H04N 23/815; H04N 23/84; H04N 23/841; H04N 23/843; H04N 23/88; H04N 23/86; H04N 23/87; H04N 23/95;
(Continued)

(56) References Cited

U.S. PATENT DOCUMENTS

| | | | |
|---|---|---|---|
| 2011/0058802 A1* | 3/2011 | Forutanpour | H04N 23/70 396/213 |
| 2015/0326840 A1* | 11/2015 | Usui | H04N 23/11 348/148 |

(Continued)

*Primary Examiner* — John W Miller
*Assistant Examiner* — Humam M Satti
(74) *Attorney, Agent, or Firm* — WOMBLE BOND DICKINSON (US) LLP

(57) ABSTRACT

In one embodiment, a system configures an image signal processor (ISP) of an autonomous driving vehicle (ADV) with a first set of ISP configuration parameters, where the ISP is used to process raw image data of an image sensor of the ADV based on the first set of ISP configuration parameters. The system determines whether one or more criteria is satisfied, where the one or more criteria corresponds to an expected change in a characteristic of ambient light being perceived by the image sensor of the ADV. In response to determining that the one or more criteria is satisfied, the system configures the ISP of the ADV with a second set of ISP configuration parameters, where the ISP is used to apply an image processing algorithm to raw image data based on the second set of ISP configuration parameters to generate an image.

20 Claims, 9 Drawing Sheets

(51) Int. Cl.
*G06V 10/94* (2022.01)
*G06V 20/56* (2022.01)
*H04N 23/71* (2023.01)

(58) Field of Classification Search
CPC .. H04N 23/951; H04N 23/958; H04N 23/959; H04N 25/61; H04N 25/611; H04N 25/615; H04N 25/6153; H04N 25/616; H04N 25/617; H04N 25/618; H04N 25/62; H04N 25/621; G06T 7/80; G06T 7/97
See application file for complete search history.

(56) References Cited

U.S. PATENT DOCUMENTS

| | | | |
|---|---|---|---|
| 2018/0060675 A1* | 3/2018 | Ji | H04N 23/75 |
| 2019/0346742 A1* | 11/2019 | Cammenga | G02F 1/133528 |
| 2021/0084218 A1* | 3/2021 | Sakai | H04N 23/73 |
| 2021/0400171 A1* | 12/2021 | Zhao | H04N 23/61 |

* cited by examiner

| Criteria | ISP Configuration Parameters | Priority |
|---|---|---|
| Time (7AM-7PM) | ISP Configuration Parameters set A | 3 |
| Time (7PM-10PM) | ISP Configuration Parameters set B | 3 |
| Tunnel Type1 Entrance | ISP Configuration Parameters set C | 2 |
| Tunnel Type2 Entrance | ISP Configuration Parameters set D | 2 |
| ADV Facing Direction of Sun | ISP Configuration Parameters set E | 1 |
| ... | ... | ... |
| Criteria N | ISP Configuration Parameters Set N | 1 |

FIG. 6A

| Tunnel Entrance Coordinates | Tunnel Types |
|---|---|
| Zone 509 | 1 |
| Zone 511 | 1 |
| ... | ... |
| Zone Z | 2 |

FIG. 6B

ON-BOARD TUNING OF IMAGE SIGNAL PROCESSOR FOR CAMERAS OF AUTONOMOUS VEHICLES

TECHNICAL FIELD

Embodiments of the present disclosure relate generally to operating autonomous driving vehicles. More particularly, embodiments of the disclosure relate to on-board tuning of image signal processor (ISP) for cameras of autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Image signal processors (ISP) are used to process image data for camera systems of autonomous driving vehicles (ADVs). ISP can be used to improve image quality of the images by applying ISP algorithms such as demosaic, white balancing, denoising, color correction, and so forth. However, the improvement to the image quality differs when the configuration settings of the ISP is suboptimal for the ambient light environment.

BRIEF DESCRIPTION OF THE DRAWINGS

Embodiments of the disclosure are illustrated by way of example and not limitation in the figures of the accompanying drawings in which like references indicate similar elements.

FIG. 6A is a block diagram illustrating example criteria mappings to sets of ISP configurations parameters according to an embodiment.

FIG. 6B is a block diagram illustrating road tunnel entrance coordinates mapping to different types of tunnels according to an embodiment.

DETAILED DESCRIPTION

Figure 1:
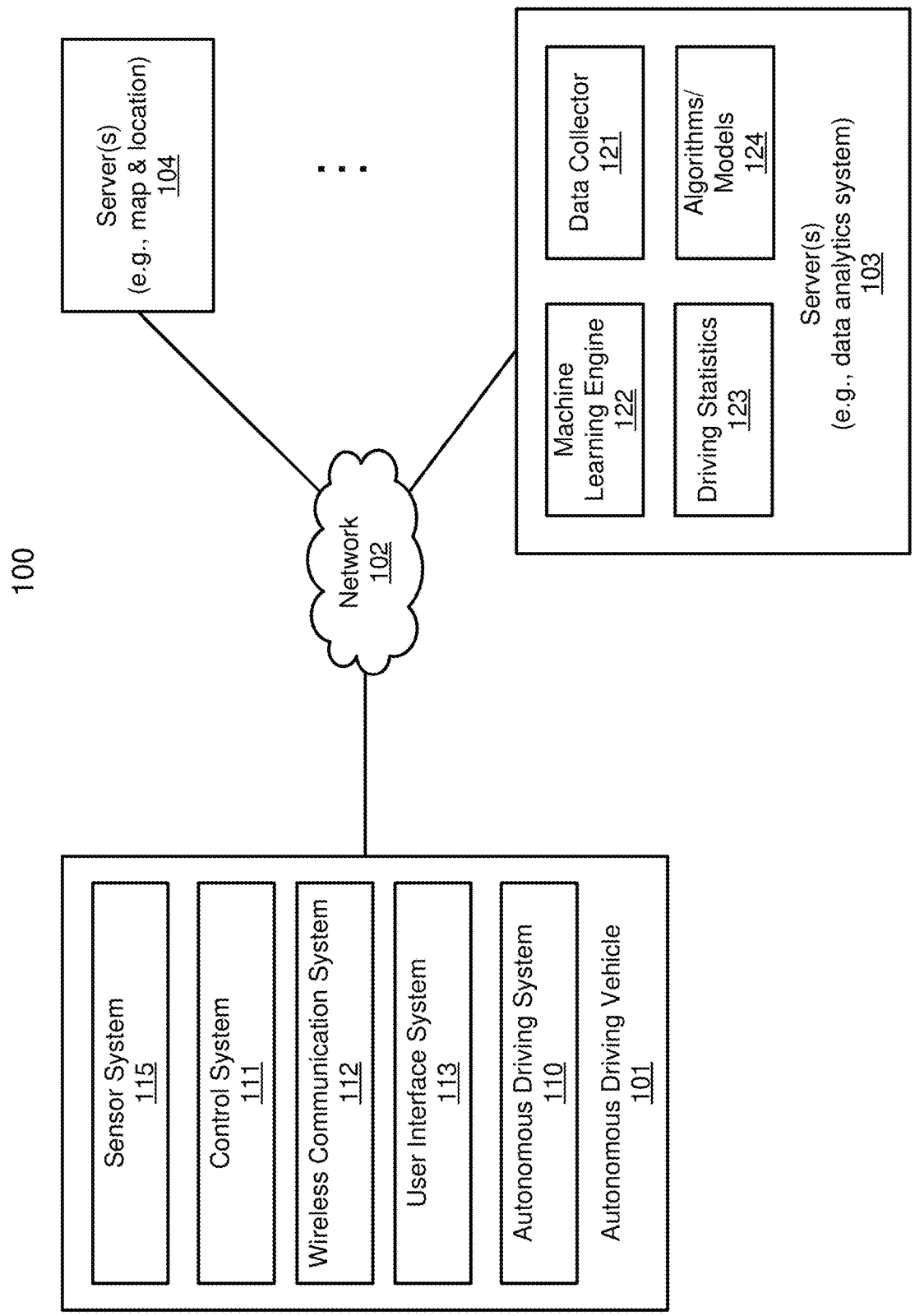
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a camera system of an autonomous driving vehicle (ADV) uses information from a satellite navigation system (such as a global positioning system (GPS)) and/or map information to determine the expected ambient lighting conditions. The system configures an image signal processor (ISP) of the ADV with a set of selected configuration parameters for the expected ambient lighting conditions to improve the perception of the on-board cameras of the ADV. This way, the image quality of the on-board cameras is not degraded from a change in the ambient light conditions.

Ambient lighting is critical for camera systems of an autonomous driving vehicle (ADV) because lighting can affect the quality of the images being captured by the on-board cameras. When an autonomous driving vehicle (ADV) experiences significant changes to the ambient lighting conditions, such as before and after entering a road tunnel, the image quality of on-board cameras may degrade due to the changes in the ambient lighting conditions.

A previous implementation uses a same set of configuration parameters for the ISP of the ADV irrespective of the ambient light conditions of the ADV, whether or not the camera sensors of the ADV is operating at night or during the day, or experience different ambient light conditions.

According to an embodiment, a system configures an image signal processor (ISP) of an autonomous driving vehicle (ADV) with a first set of ISP configuration parameters, where the ISP is used to process raw image data of an image sensor of the ADV based on the first set of ISP configuration parameters. The system determines whether one or more criteria is satisfied, where the one or more criteria corresponds to an expected change in a characteristic of ambient light being perceived by the image sensor of the ADV. In response to determining that the one or more criteria is satisfied, the system configures the ISP of the ADV with a second set of ISP configuration parameters, where the ISP is used to apply an image processing algorithm to raw image data based on the second set of ISP configuration parameters to generate an image.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
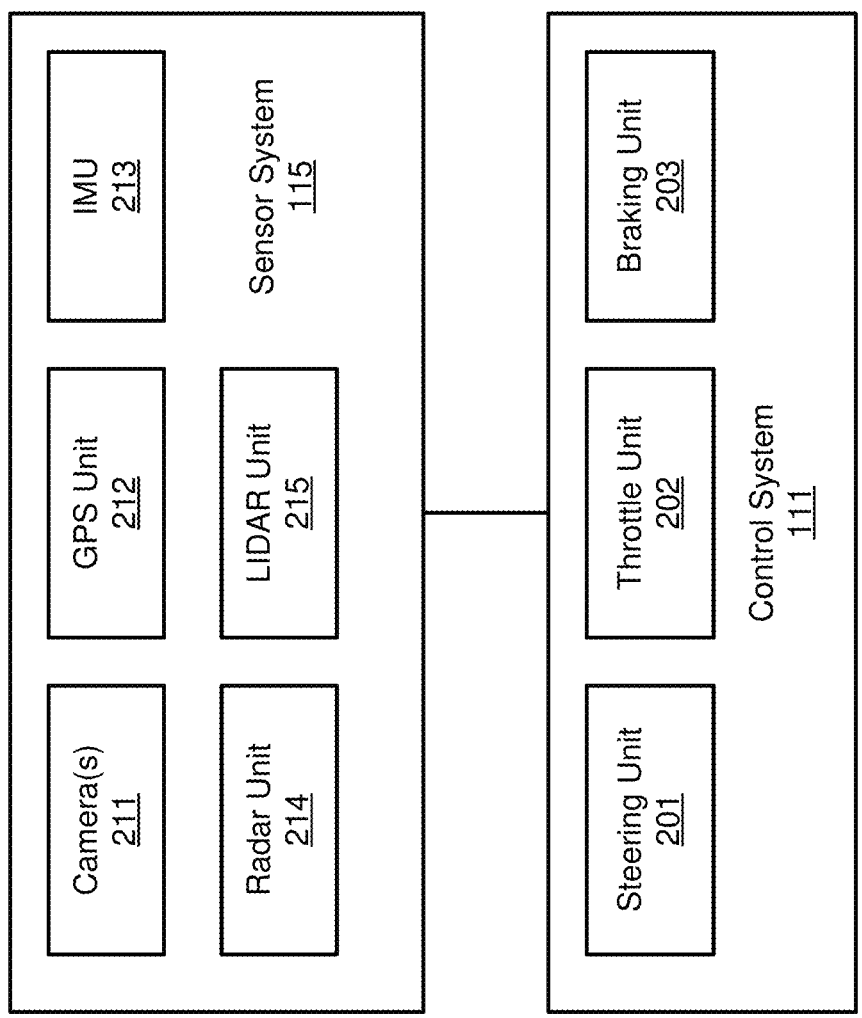
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include criteria when to reconfigure an ISP of the ADV to a different set of ISP configuration parameters. Different sets of ISP configuration parameters can be predetermined according to characteristics of the ambient light expected to be perceived by the ADV. Some characteristics include the color temperature or intensity of the light.

Algorithms 124 can then be uploaded on ADVs to be utilized during autonomous driving in real-time.

Figure 3A:
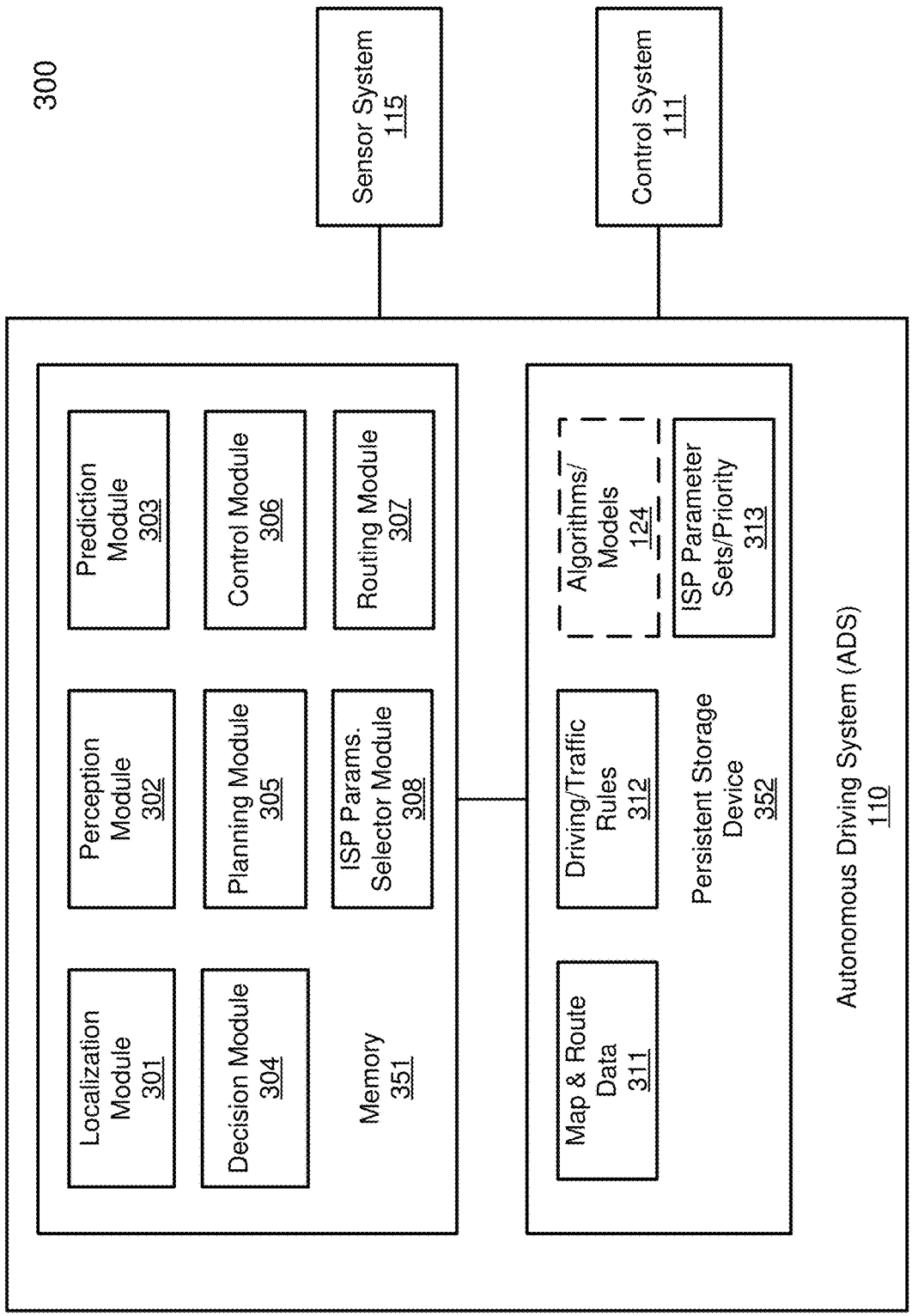
FIGS. 3A-3B are block diagrams illustrating an example of an autonomous driving system used with an autonomous driving vehicle according to one embodiment.
Figure 3B:
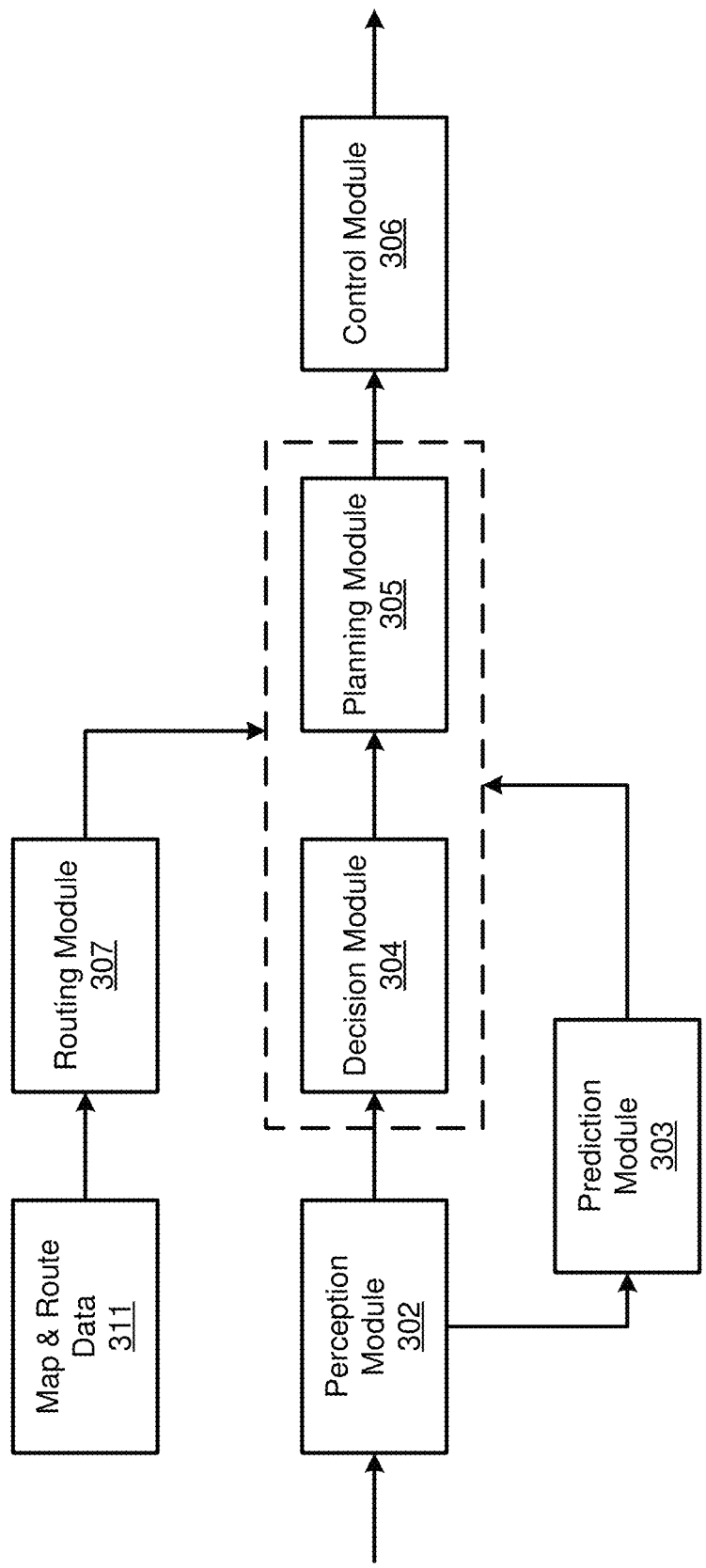

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and ISP parameters selector module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving.

The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 3C:
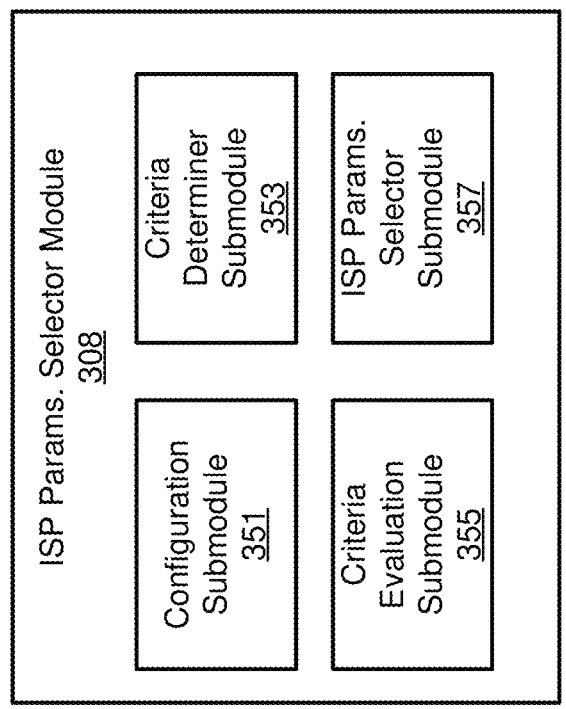
FIG. 3C is a block diagram illustrating an example of an ISP parameters selector module according to one embodiment.

FIG. 3C illustrates an ISP parameters selector module 308 according to an embodiment. ISP parameters selector module 308 can select and configure an ISP with a set of ISP configuration parameters. In one embodiment, ISP parameters selector module 308 includes configuration submodule 351, criteria determiner submodule 353, criteria evaluation submodule 355, and ISP parameters selector submodule 357. Configuration submodule 351 can configure an ISP with a set of ISP configuration parameters. Criteria determiner submodule 353 can determine one or more criteria for ISP reconfiguration. Criteria evaluation submodule 355 can evaluation if the one or more criteria is met or satisfied. When the criteria is met, ISP parameters selector submodule 357 can select a set of ISP configuration parameters corresponding to the criteria to configure the ISP with the selected set of ISP configuration parameters. Note that some of modules 351-357 may be integrated together as an integrated module.

Figure 4:
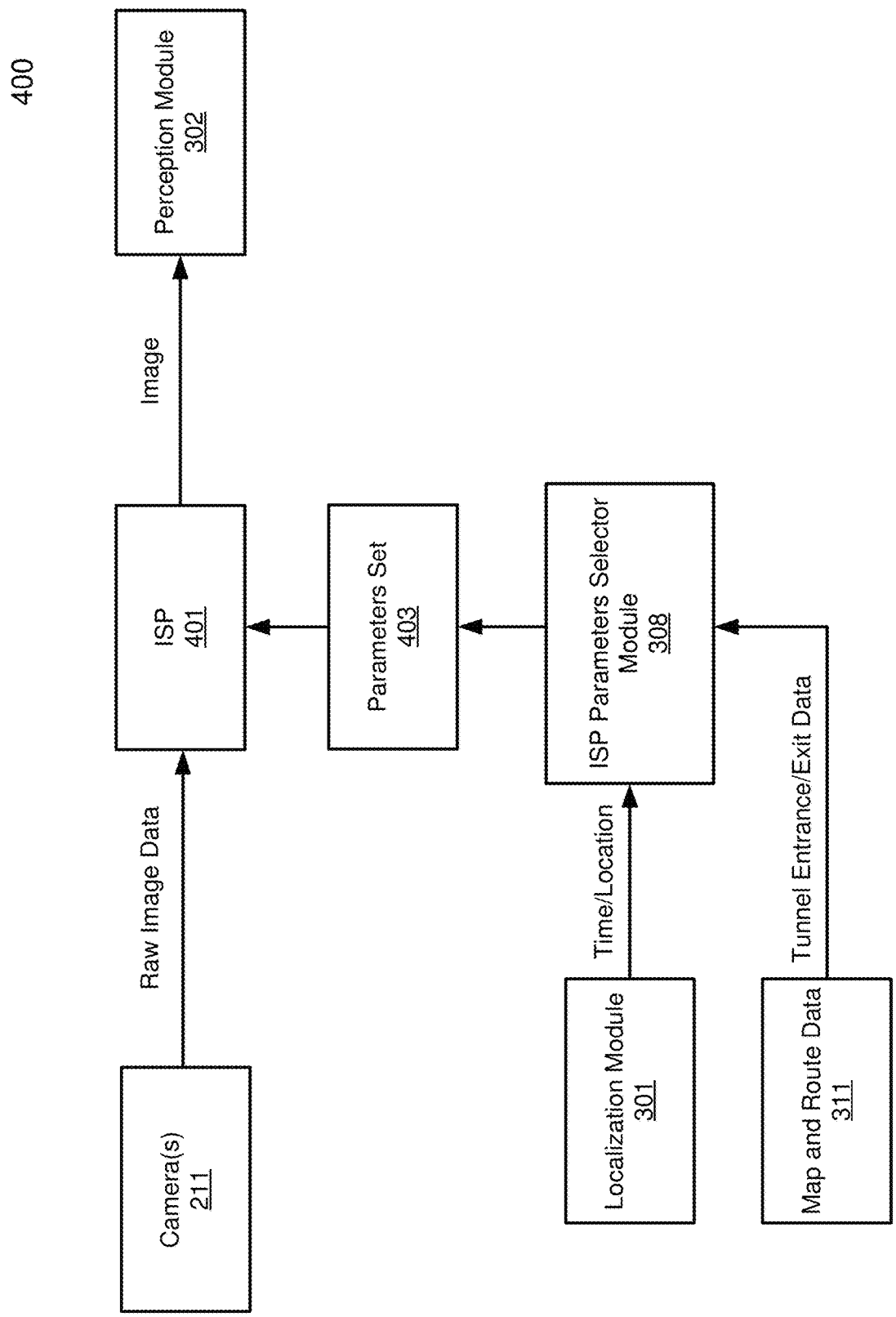
FIG. 4 is a block diagram illustrating an example of an ISP configuration parameters selection system according to an embodiment.

FIG. 4 is a block diagram illustrating an example of an ISP configuration parameters selection system 400 according to an embodiment. ISP configuration parameters selection system 400 can configure the ISP parameters of an ISP in real-time while an ADV is in operation.

In one embodiment, ISP configuration parameters selection system 400 includes localization module 301, ISP parameters selector module 308, cameras 211, ISP 401, and perception module 302. ISP parameters selector module 308 can receive a reference time and/or location information from localization module 301. The reference time and location information may be received from a satellite navigation system, such as GPS, GLONASS, Beidou, or Galileo system. The reference time can be received from a satellite, where the satellite maintains the reference time as an atomic clock of the satellite, and/or the reference time is maintained by an on-board clock/timer at the ADV. In one embodiment, module 308 receives map data from map and route data 311.

In one embodiment, using the reference time, location, and/or map data, ISP parameter selector module 308 determines if one or more criteria are met and selects a set of ISP configuration parameters 403 for configuration corresponding to the met criteria. The ISP configuration parameters can correspond to adjustments (tuning) of the ISP to optimize the generation of the image for autofocus (AF), auto exposure (AE), and/or auto white balance (AWB). The ISP configuration parameters are used by the ISP algorithms that are applied to raw image data captured by cameras to generate images.

In one embodiment module 308 can configure ISP 401 in real-time using the ISP configuration parameters 403. Once configured, when camera(s) 211 captures raw image data, the raw image data is applied an ISP algorithm using the selected set of ISP configuration parameters 403 to generate an image. The ISP algorithm can include any one or a combination of: image format conversion, image resize, exposure adjustment, black level adjustment, color adjustment, pixel correction, color interpolation, and/or de-noise algorithms. The ISP algorithm can be directed to generate the images for machine learning (ML) applications executed by perception module 302. Here, applying the ISP algorithm processes and prepares the generated images to be used by perception module 302.

Once an image is received by perception module 302, the image is used by perception module 302 for object detection, object classification, or other machine learning algorithms to perceive an environment of the ADV. An example of a ML algorithm includes applying a deep convolutional neural network to the generated image for object detection.

Here, the quality of the generated images is affected by the ISP configuration parameters and the ISP configuration parameters are selected according to certain criteria. Examples of some criteria are shown in FIG. 6A according to one embodiment. Note that the criteria and corresponding parameter sets/priority, shown in FIG. 6A, can be stored in persistent memory (such as ISP parameters sets/priority 313) of ADV 101.

The criteria can be evaluated by ADV 101 in response to a change in criteria (or time, location of ADV 101). For example, when the criteria for a certain time of day (e.g., 7 AM-7 PM) is met, the ISP configuration parameters set A can be used to configure ISP 401 of FIG. 4. When the time of day is 7 PM-10 PM, the ISP configuration parameters set B can be used to configure ISP 401. When the criteria when the ADV is about to enter a road tunnel of type1, the ISP configuration parameters set C can be used to configure ISP 401. When the criteria when the ADV is about to enter a road tunnel of type2, the ISP configuration parameters set C can be used to configure ISP 401. When the criteria that the heading direction of the ADV 101 is facing the direction of the sun, the ISP configuration parameters set D can be used to configure ISP 401.

Different criteria can have different priorities according to some embodiments. For example, the criteria when ADV 101 heading direction is facing the direction of the sun has a priority of 1, while the time of day criteria has a lower priority of 3. Thus, when more than one conditions are met, module 308 applies the ISP configuration parameters corresponding to the criteria with the highest priority, e.g., set D is applied instead of set A since set D corresponds to a higher priority of 1 and set A corresponds to a lower priority of 3. Note that only some criteria is shown for purposes of illustration in FIG. 6A and the list of criteria can further include weather patterns, fire, or any other conditions/events that can affect the characteristics of the ambient lighting condition of the ADV.

Figure 5:
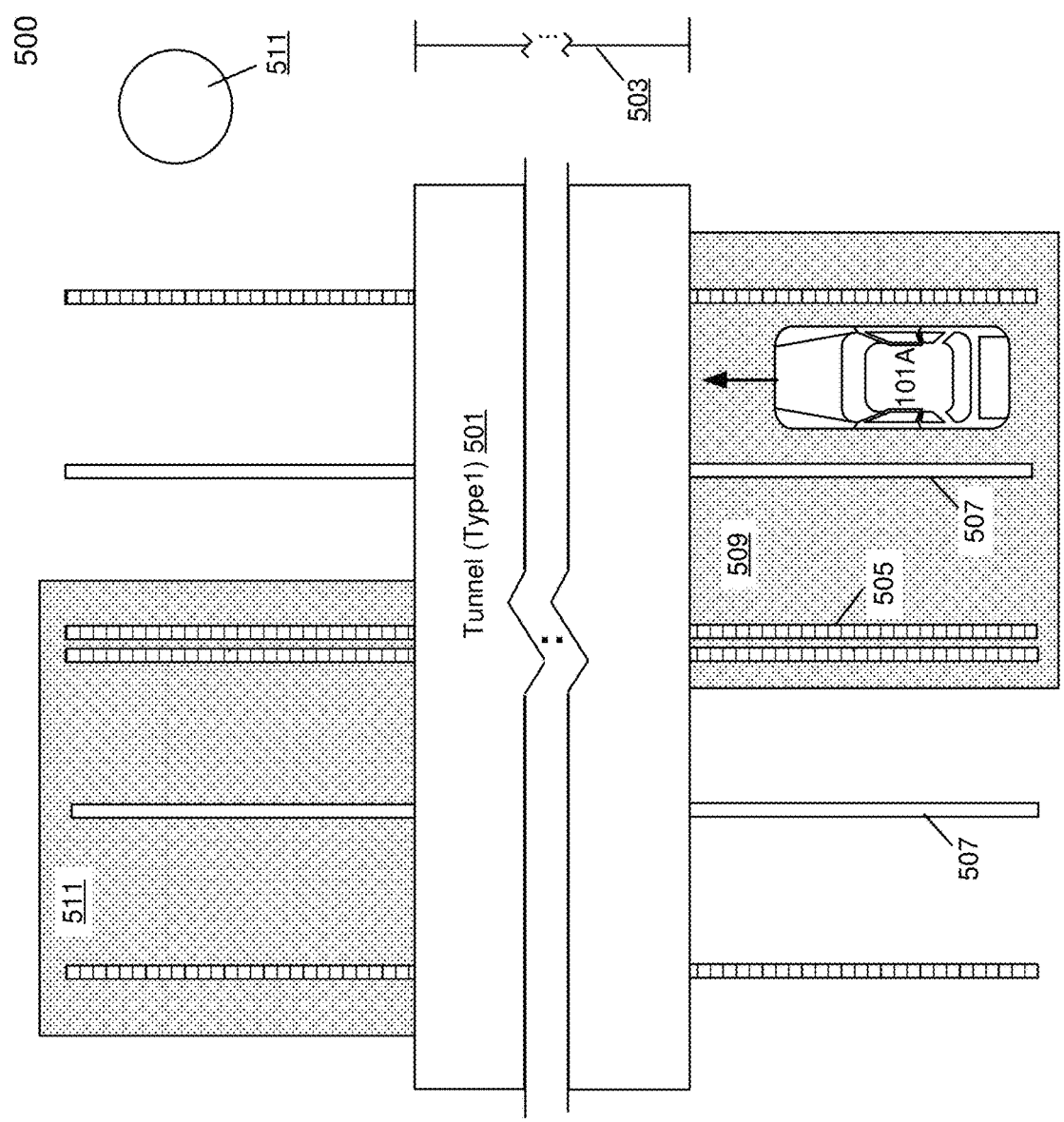
FIG. 5 is a block diagram illustrating a scenario to select and configure an ISP of an ADV according to an embodiment.

FIG. 5 is a block diagram illustrating a scenario 500 to select and configure an ISP of an ADV according to an embodiment. In scenario 500, the time of day can be 12:01 PM and an ISP of ADV 101 can be configured with parameter set A according to the criteria that the time of day of 12:01 PM between 7 AM-7 PM is met. Referring to FIG. 5, scenario 500 further denotes that ADV 101 is entering an entrance of road tunnel 501 having a tunnel length of distance 503 and the road outside and inside of road tunnel 501 has four lanes.

The four lanes are separated by a double yellow lane line 505 for the two opposite driving directions of the road, where each direction is separated by a single white lane line 507. Here, while the white and yellow lane lines can appear as white and yellow lane lines respectively from the perception of the human observer, the white and yellow lane lines may be transformed by an ISP algorithm of an ISP of ADV 101 to other colors so to further contrast the white from the yellow coloring of the lane lines. Such an ISP algorithm applied to the generated images improves an inference accuracy of the ML algorithms when the images are used for the ML algorithms.

Referring to FIG. 5, in one embodiment, the entrance to road tunnel 501 can be represented by zone 509, where zones 509 and 511 are stored as coordinates (and tunnel types) in map data 311 specifying the entrances to tunnel 501. In another embodiment, the coordinates of zones 509 and 511 (and tunnel types, e.g., tunnel type1) can be stored in a table as shown in FIG. 6B. Here, ADV 101 is considered to be in zone 509 when ADV 101 is within a threshold distance to the coordinate of zone 509.

In one embodiment, when ADV 101 enters zone 509, an ISP parameters selector module 308 of ADV 101 evaluates that the criteria of ADV 101 entering a road tunnel of type1 is met. When ADV 101 determines that such a criteria is met, ADV 101 determines the corresponding tunnel type to be type1 and selects the ISP configuration parameters set C for tunnel type1. ADV 101 then configures an ISP of ADV 101 using the selected parameters set C. Thus, after ADV 101 enters tunnel, ADV 101 can quickly adapt to the ambient lighting conditions inside tunnel 501 because the ambient light inside tunnel 501 is predetermined to correspond to the parameters set C.

In one embodiment, the different tunnel types can correspond to different color temperatures and/or intensities of the expected ambient light inside the corresponding tunnels. For example, tunnel type 1 can correspond to yellow incandescent lighting inside tunnel 501, while tunnel type 2 can correspond to no lighting inside a corresponding tunnel. Here, color temperature refers to the temperature of an ideal black-body radiator that radiates light of a color comparable to that of a light source. It is a system of numerical values to measure the color characteristics of the light source ranging from warm (e.g., yellow/red) to cool colors (e.g., blue). Light intensity refers to a measure of the amount of light (lumens) falling on a surface. While two types of tunnels are illustrated in FIG. 6A, various ambient lighting conditions can be configured for additional tunnel types.

In one embodiment, since ADV 101 has the ISP adapted to the ambient light inside tunnel 501, the image generated by ADV 101 can apply an ISP algorithm to the raw image data to generate an image, where the ISP algorithm utilizes the configured ISP configuration parameters and causes a different image to be generated than if the ISP algorithm utilizes a different set of ISP configuration parameters.

Next, the generated image can then be used by a perception module and different machine learning algorithms can be applied to the images to identify and classify obstacles in the images accordingly. Had the ISP settings remained unchanged, the difference in ambient light condition may cause an inference error and the perception module may fail to identify the obstacles, e.g., a white lane line might be identified as a yellow lane line due to characteristics of the ambient lighting (the temperature color and/or intensity) being different inside and outside of tunnel 501.

In one embodiment, ADV 101 further uses map data 311 to determine the length of the tunnel to be distance 503 and determines when ADV 101 has traveled a distance that is equal to distance 503. The distance traveled can be determined according to vehicle dynamics, e.g., the distance traveled is equal to the velocity of the vehicle multiplied by the time traveled. Once the ADV 101 has determined that ADV 101 has traveled a distance equal to the tunnel length, ADV 101 configures the ISP back to parameter set A, e.g., prior to entering tunnel 501. This way, the ISP is once again adapted to the ambient light conditions outside of tunnel 501.

In another embodiment, when ADV 101 enters zone 509 and ADV 101 determines a heading direction of ADV 101 is facing the sun 511, ADV 101 determines two configuration criteria are met. In this case, ADV 101 determines a highest priority from the competing criteria. ADV 101 then applies the ISP configuration parameters set according to the highest priority (e.g., parameter set E has a higher priority of 1 in comparison with parameter set C of priority 2) from the competing criteria.

Figure 7:
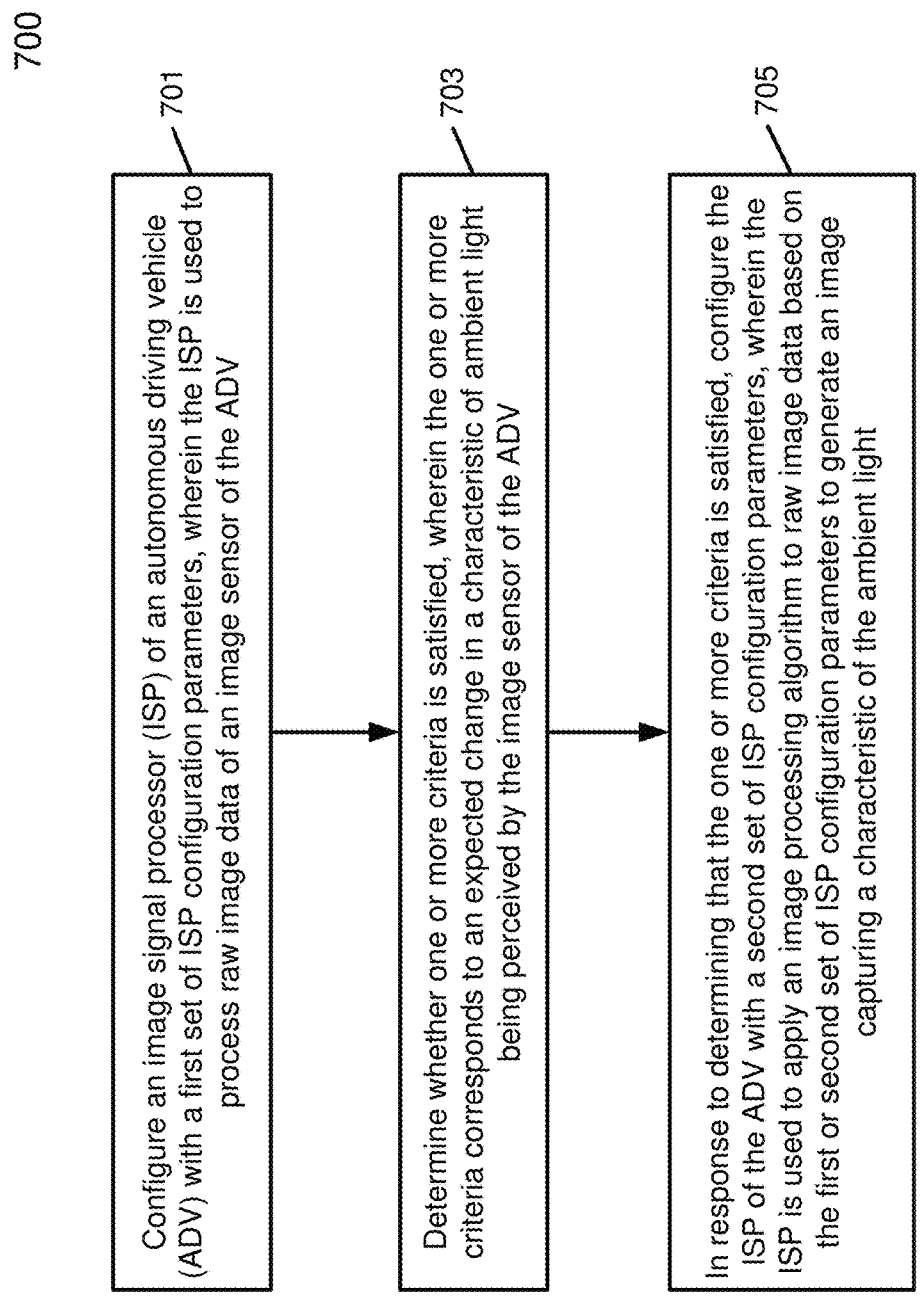
FIG. 7 is a flow diagram illustrating a process to select a set of ISP configuration parameters for an ISP according to an embodiment.

FIG. 7 is a flow diagram illustrating a process to select a set of ISP configuration parameters for an ISP according to an embodiment. Process 700 may be performed by processing logic which may include software, hardware, or a combination thereof. For example, process 700 may be performed by ISP parameters selector module 308 of FIG. 3C.

Referring to FIG. 7, at block 701, processing logic configures an image signal processor (ISP) of an autonomous driving vehicle (ADV) 101 with a first set of ISP configuration parameters (e.g., set A), where the ISP (e.g., ISP 401 of FIG. 4) is used to process raw image data of an image sensor (e.g., camera(s) 211 of FIG. 4) of the ADV 101 based on the first set of ISP configuration parameters (e.g., set A according to the time of day criteria).

At block 703, processing logic determines whether one or more criteria is satisfied, wherein the one or more criteria corresponds to an expected change in a characteristic of ambient light being perceived by the image sensor of the ADV.

At block 705, in response to determining that the one or more criteria (e.g., criteria C, D, E, etc.) is satisfied, processing logic configures the ISP of the ADV with a second set of ISP configuration parameters (e.g., set C, set D, set E, etc.), where the ISP is used to apply an image processing algorithm (ISP algorithm) to raw image data based on the second set of ISP configuration parameters to generate an image.

In one embodiment, determining whether the one or more criteria is satisfied includes receiving a signal from a satellite-based navigation system, determining a location of the ADV based on the received signal, and determining the location is within a tolerance distance (e.g., 5 meters) to one of a plurality of predetermined locations (e.g., zones 509, 511) corresponding to an entrance of a road tunnel based on map data (e.g., map data 311).

In one embodiment, processing logic further determines the ADV has reached an end of the road tunnel. In response to determining the ADV has reached the end of the road tunnel, processing logic configures the ISP with the first set of ISP configuration parameters (e.g., set A), where the ISP is used to apply an image processing algorithm to raw image data based on the first set of ISP configuration parameters to generate an image.

In one embodiment, determining the ADV has reached the end of the road tunnel includes determining a distance (e.g., distance 503) between the entrance of the road tunnel and the end of the road tunnel and a distance traveled by the ADV based on vehicle dynamics of the ADV.

In one embodiment, determining whether the one or more criteria is satisfied includes determining a time of day, determining a heading direction of the ADV, and determining whether the ADV is facing a direction of a sun based on the time of day and the heading direction of the ADV.

In one embodiment, the first set of ISP configuration parameters is determined based on a characteristic of an ambient light being below a first threshold.

In one embodiment, the second set of ISP configuration parameters is determined based on a characteristic of an ambient light being above a first threshold.

In one embodiment, processing logic further captures, by the image sensor, the raw image data and applies an image processing algorithm to the raw image data based on a first or second set of ISP configuration parameters to generate the image.

In one embodiment, the characteristic of an ambient light includes color temperature or light intensity of an ambient light.

In one embodiment, the image processing algorithm comprises one of: image format conversion, image resize, exposure adjustment, black level adjustment, color adjustment, pixel correction, color interpolation, or de-noise algorithms.

In one embodiment, processing logic applies a machine learning algorithm to a generated image for object detection and/or objects classification, wherein an object detected includes a road lane and the first or second set of ISP configuration parameters contrast a white road lane from a yellow road lane when a color temperature of the ambient light is a warm color.

In one embodiment, processing logic applies an image processing algorithm to the raw image data based on a third set of ISP configuration parameters if the ADV is facing a direction of a sun.

In one embodiment, processing logic further determines a characteristic of an ambient light of the ADV. In response to determining the characteristic of an ambient light of the ADV is above a second threshold (e.g., ADV 101 is facing the sun), processing logic configures the ISP with a third set of ISP configuration parameters (e.g., set E).

In one embodiment, the first set of ISP configuration parameters is determined based on a time of day.

In one embodiment, the first or second set of ISP configuration parameters are used to automatically tune an image for autofocus (AF), auto exposure (AE), or auto white balance (AWB).

In one embodiment, an image processing algorithm is applied to the raw image data to improve an inference accuracy of a machine learning algorithm for perception.

In one embodiment, processing logic further configures the ISP of the ADV according to priorities corresponding to two or more criteria when two or more criteria are satisfied.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
configuring an image signal processor (ISP) of an autonomous driving vehicle (ADV) with a first set of ISP configuration parameters, wherein the ISP is used to process raw image data of an image sensor of the ADV based on the first set of ISP configuration parameters;
determining whether one or more criteria is satisfied, wherein the one or more criteria corresponds to an expected change in a characteristic of ambient light being perceived by the image sensor of the ADV; and
in response to determining that a first criteria and a second criteria of the one or more criteria corresponding to the expected change in the characteristic of ambient light being perceived by the image sensor of the ADV are satisfied, configuring the ISP of the ADV with a second set of ISP configuration parameters based on the second criteria having a higher priority than the first criteria, wherein the ISP is used to apply an image processing algorithm to raw image data based on the second set of ISP configuration parameters to generate an image.

2. The method of claim 1, wherein determining whether the one or more criteria is satisfied comprises:
receiving a signal from a satellite-based navigation system;
determining a location of the ADV based on the received signal; and
determining the location is within a tolerance distance to one of a plurality of predetermined locations corresponding to an entrance of a road tunnel based on map data.

3. The method of claim 2, further comprising:
determining the ADV has reached an end of the road tunnel; and
in response to determining the ADV has reached the end of the road tunnel, configuring the ISP with the first set of ISP configuration parameters, wherein the ISP is used to apply an image processing algorithm to raw image data based on the first set of ISP configuration parameters to generate an image.

4. The method of claim 3, wherein determining the ADV has reached the end of the road tunnel comprises determining a distance between the entrance of the road tunnel and the end of the road tunnel and a distance traveled by the ADV based on vehicle dynamics of the ADV.

5. The method of claim 1, wherein determining whether the one or more criteria is satisfied comprising:
determining a time of day;
determining a heading direction of the ADV; and
determining whether the ADV is facing a direction of a sun based on the time of day and the heading direction of the ADV.

6. The method of claim 1, wherein the first set of ISP configuration parameters is determined based on a characteristic of an ambient light being below a first threshold.

7. The method of claim 1, wherein the second set of ISP configuration parameters is determined based on a characteristic of an ambient light being above a first threshold.

8. The method of claim 1, further comprising:
capturing the raw image data; and
applying an image processing algorithm to the raw image data based on a first or second set of ISP configuration parameters to generate the image.

9. The method of claim 1, wherein the characteristic of an ambient light includes color temperature or light intensity of an ambient light.

10. The method of claim 1, wherein the image processing algorithm comprises one of: image format conversion, image resize, exposure adjustment, black level adjustment, color adjustment, pixel correction, color interpolation, or de-noise algorithms.

11. The method of claim 1, further comprising applying a machine learning algorithm to a generated image for object detection and/or objects classification, wherein an object detected includes a road lane and the first or second set of ISP configuration parameters contrast a white road lane from a yellow road lane when a color temperature of the ambient light is a warm color.

12. The method of claim 1, further comprising applying an image processing algorithm to the raw image data based on a third set of ISP configuration parameters if the ADV is facing a direction of a sun.

13. The method of claim 1, further comprising:
determining a characteristic of an ambient light of the ADV; and in response to determining the characteristic of an ambient light of the ADV is above a second threshold, configuring the ISP with a third set of ISP configuration parameters.

14. The method of claim 1, wherein the first set of ISP configuration parameters is determined based on a time of day.

15. The method of claim 1, wherein the first or second set of ISP configuration parameters are used to automatically tune an image for autofocus (AF), auto exposure (AE), or auto white balance (AWB).

16. The method of claim 1, wherein an image processing algorithm is applied to the raw image data to improve an inference accuracy of a machine learning algorithm for perception.

17. The method of claim 1, further comprising configuring the ISP of the ADV according to priorities corresponding to two or more criteria when two or more criteria are satisfied.

18. A non-transitory machine-readable medium having instructions stored therein, which when executed by a processor, cause the processor to perform operations, the operations comprising:
- configuring an image signal processor (ISP) of an autonomous driving vehicle (ADV) with a first set of ISP configuration parameters, wherein the ISP is used to process raw image data of an image sensor of the ADV based on the first set of ISP configuration parameters;
- determining whether one or more criteria is satisfied, wherein the one or more criteria corresponds to an expected change in a characteristic of ambient light being perceived by the image sensor of the ADV; and
- in response to determining that a first criteria and a second criteria of the one or more criteria corresponding to the expected change in the characteristic of ambient light being perceived by the image sensor of the ADV are satisfied, configuring the ISP of the ADV with a second set of ISP configuration parameters based on the second criteria having a higher priority than the first criteria, wherein the ISP is used to apply an image processing algorithm to raw image data based on the second set of ISP configuration parameters to generate an image.

19. The non-transitory machine-readable medium of claim 18, wherein determining whether the one or more criteria is satisfied comprises:
- receiving a signal from a satellite-based navigation system;
- determining a location of the ADV based on the received signal; and
- determining the location is within a tolerance distance to one of a plurality of predetermined locations corresponding to an entrance of a road tunnel based on map data.

20. A data processing system, comprising:
- a processor; and
- a memory coupled to the processor to store instructions, which when executed by the processor, cause the processor to perform operations, the operations including:
  - configuring an image signal processor (ISP) of an autonomous driving vehicle (ADV) with a first set of ISP configuration parameters, wherein the ISP is used to process raw image data of an image sensor of the ADV based on the first set of ISP configuration parameters;
  - determining whether one or more criteria is satisfied, wherein the one or more criteria corresponds to an expected change in a characteristic of ambient light being perceived by the image sensor of the ADV; and
  - in response to determining that a first criteria and a second criteria of the one or more criteria corresponding to the expected change in the characteristic of ambient light being perceived by the image sensor of the ADV are satisfied, configuring the ISP of the ADV with a second set of ISP configuration parameters based on the second criteria having a higher priority than the first criteria, wherein the ISP is used to apply an image processing algorithm to raw image data based on the second set of ISP configuration parameters to generate an image.

* * * * *